(12) United States Patent  
Bianconi et al.

(10) Patent No.: US 12,481,977 B2  
(45) Date of Patent: Nov. 25, 2025

(54) SECURE COVER WITH TAMPER RESISTANT LANDING AREA

(71) Applicant: SUMUP PAYMENTS LTD., London (GB)

(72) Inventors: Stefano Bianconi, Berlin (DE); Ricardo Maffazioli, Berlin (DE)

(73) Assignee: SUMUP PAYMENTS LTD., London (GB)

( * ) Notice: Subject to any disclaimer, the term of this patent is extended or adjusted under 35 U.S.C. 154(b) by 0 days.

(21) Appl. No.: 18/808,761

(22) Filed: Aug. 19, 2024

(65) Prior Publication Data

US 2024/0412194 A1 Dec. 12, 2024

Related U.S. Application Data

(63) Continuation of application No. 18/000,254, filed as application No. PCT/US2021/051845 on Sep. 24, 2021, now Pat. No. 12,093,924.

(60) Provisional application No. 63/082,749, filed on Sep. 24, 2020.

(51) Int. Cl.
```
G06Q 20/34      (2012.01)
G06K 7/00       (2006.01)
G06K 7/10       (2006.01)
G06Q 20/20      (2012.01)
G07F 7/08       (2006.01)
G09G 3/36       (2006.01)
H04B 5/26       (2024.01)
H04B 5/70       (2024.01)
```

(52) U.S. Cl.
CPC ............ *G06Q 20/34* (2013.01); *G06K 7/006* (2013.01); *G06K 7/0091* (2013.01); *G06K 7/10297* (2013.01); *G06Q 20/20* (2013.01); *G07F 7/0886* (2013.01); *G09G 3/36* (2013.01); *H04B 5/26* (2024.01); *G09G 2310/02* (2013.01); *G09G 2340/0435* (2013.01); *H04B 5/70* (2024.01)

(58) Field of Classification Search
CPC ........ G06Q 20/34; G06Q 20/20; G06K 7/006; G06K 7/0091
USPC ....................................................... 235/383
See application file for complete search history.

(56) References Cited

U.S. PATENT DOCUMENTS 12,093,924 B2 * 9/2024 Bianconi ................. H04B 5/26
2021/0185809 A1 6/2021 Park

* cited by examiner

*Primary Examiner* — Ahshik Kim
(74) *Attorney, Agent, or Firm* — Synergy Patent Group LLC

(57) ABSTRACT

Various aspects of the disclosure generally relate to security for a credit card processing reader. Part of security for a reader is a secure cover having a trace mesh to discourage drilling through the cover. The mesh may be connected to one or more landing areas on the cover. The landing area has electrical pads with trace routing that provides tamper protection for the landing area.

20 Claims, 12 Drawing Sheets

SECURE COVER WITH TAMPER RESISTANT LANDING AREA

CROSS-REFERENCE TO RELATED APPLICATIONS

This application is a continuation that claims priority under 35 U.S.C. § 120 to U.S. patent application Ser. No. 18/000,254, filed Feb. 27, 2023, entitled SECURE COVER WITH TAMPER RESISTANT LANDING AREA, and is hereby incorporated by reference in its entirety, which in turn claims the benefit of and priority to international application PCT/US2021/051845, filed Sep. 24, 2021, entitled SECURE COVER WITH TAMPER RESISTANT LANDING AREA, and is hereby incorporated by reference in its entirety, which in turn claims the benefit of and priority to U.S. Provisional Patent Application No. 63/082,749, filed Sep. 24, 2020, entitled Secure Point-of-Sale Device, and is hereby incorporated by reference in its entirety.

BACKGROUND

Field of the Disclosure

The disclosure relates generally to credit card processing readers, and more specifically to security measures in the cover for a printed circuit board in a credit card processing reader.

Description of Related Art

Fundamental to the functioning of the economy is the exchange of payment for goods and services. Throughout modern commercial history, payment has typically been rendered with money in the form of currency or cash such as banknotes and coins. Cash continues to be used to purchase goods and services, but it is becoming increasingly less common. In the United States, a study by Tufts University concluded that the cost of using cash amounts to around $200 billion per year. This is primarily the costs associated with collecting, sorting and transporting the physical currency, but also includes expenses like automated teller machine (ATM) fees. The study also found that the average American wastes five and a half hours per year withdrawing cash from ATMs, which is just one of the many inconvenient aspects of physical currency. Physical currency is often unhealthy too. Researchers in Ohio spot-checked cash used in a supermarket and found 87% contained harmful bacteria.

Conventional financial transactions are fundamentally based on the value of currency, but often involve the transfer of funds that do not require the physical exchange of cash.

In the United States, the Federal Reserve Bank's Automated Clearing House (ACH) Network is a processing and delivery system that provides for the distribution and settlement of electronic credits and debits among financial institutions, and functions as an electronic alternative to paper checks. Unlike a check, which is always a debit instrument, an ACH entry may be either a credit or a debit entry. The ACH Network is also widely used to settle consumer transactions made at ATMs and point-of-sale (POS) terminals.

Physical currency is already being replaced by cryptocurrencies like Bitcoin. Bitcoin allows for direct transfers of funds between parties, without the need for a third party. A wide range of startups are now developing products based on the Bitcoin protocols, in the hope that it will compete with other global payment systems. Cash transactions worldwide rose just 1.75% between 2008 and 2012, to $11.6 trillion. Meanwhile, non-traditional payment methods rose almost 14% to total $6.4 trillion. This group includes online and mobile payment systems including PayPal, Google Wallet, Apple Passbook, and other cashless alternatives.

Thrive Analytics 2014 Digital Wallet Usage Study revealed that, despite nearly 80% of consumers being aware of digital wallets, including major players like PayPal, Google Wallet, and Apple Passbook, security concerns remain the main barrier to adoption, followed by lack of usability versus credit cards/cash (37%) and not being top of mind as a form of payment at the time of purchase (32%). Meanwhile, MasterCard and Visa face obstacles as they try to become players in the digital wallet game.

Other companies produce a point-of-sale credit card reader and app that provides transparent pricing, reliable technology and is available for major credit cards plus Google Pay and Apple Pay. Contrasting this with a traditional credit card terminal, which contains the hardware and software for generating an authorization request, these card readers work in conjunction with online systems to generate that request. Security and ensuring the secrecy of user credit card information is paramount in any credit card reader and strict standards apply to the construction and operation of these POS readers. While meeting security standards, the makers of these readers must design a product that is rugged, reliable and long-living.

In line with that need for and expectation of security and reliability, a credit card reader is expected to be resistant to tampering. Tampering, or hacking into, a credit card reader can make the reader vulnerable to being used as a skimmer (a device that steals credit card information for unauthorized use), which may or may not be known by a merchant using a hacked reader.

What's needed is a secure credit card reader that resists tampering.

SUMMARY

A cover with a non-conducting base and a plurality of landing areas coupled to the base. Each landing area includes a first and a second exposed electrical pads, each having a length of not more than 2 mm and a width of not more than 1.5 mm. A first trace is electrically coupled to the first electrical pad at a first connection point. A second trace is electrically coupled to the second electrical pad at a second connection point. The first connection point is directly between the first electrical pad and the second electrical pad. A conductive mesh is coupled to the base and directly between the plurality of landing areas, the mesh including a third trace and a fourth trace.

Following a first path along the first trace, starting at the first connection point and moving away from the first connection point, the first trace turning in the direction of the first electrical pad only after a distance along the first path at least greater than a length of the second electrical pad.

The second connection point may be directly between the first electrical pad and the second electrical pad.

Following a second path along the second trace starting at the second connection point and moving away from the second connection point, the second trace turning in the direction of the second electrical pad only after a distance along the second path at least greater than a length of the first electrical pad.

The length of the third trace and length of the fourth trace being more than double the distance between any of the plurality of landing pads.

The width of the third trace and the fourth trace being no more than 150 micrometers and the separation between the third trace and the fourth trace being no more than 250 micrometers.

The distance between the first and second trace is between 100 and 200 micrometers.

The mesh is entirely covering one side of the base not covered by the plurality of landing areas.

The second electrical pad being rectangular, the first trace being closer to three sides of the second electrical pad than the second trace, as measured perpendicular from each of the three sides of the second electrical pad.

The first electrical pad being rectangular, the second trace being closer to three sides of the first electrical pad than the first trace, as measured perpendicular from each of the three sides of the first electrical pad.

The plurality of landing areas being on and defined by a raised surface such that they form a plane separate from a plane formed by the base.

The plurality of landing areas further including a first landing area, a second landing area, a third landing area, a fourth landing area, the base having edges and each of the four landing areas near one of the edges, the mesh further including a fifth trace and a sixth trace.

The first trace of the first landing area is electrically connected to the third trace. The third trace is electrically connected to the first trace of the second landing area. The second trace of the first landing area is electrically connected to the fourth trace. The fourth trace is electrically connected to the second trace of the second landing area. The first trace of the third landing area is electrically connected to the fifth trace. The fifth trace is electrically connected to the first trace of the fourth landing area. The second trace of the third landing area is electrically connected to the sixth trace. The sixth trace is electrically connected to the second trace of the fourth landing area.

Each of the first and second electrical pads are spaced apart from one another by no more than 5 mm.

A point-of-sale credit card reader may include all of the aforementioned, including a printed circuit board (PCB) coupled to the cover.

A cover may include a non-conducting base, a plurality of landing areas coupled to the base, with each landing area including a first and a second exposed electrical pad, each having a length of not more than 2 mm and a width of not more than 1.5 mm. A first trace is electrically coupled to the first electrical pad at a first connection point. A second trace is electrically coupled to the second electrical pad at a second connection point. A second length is established by measuring from the second connection point along the second trace to a point at which the second trace is further from the second electrical pad than the first trace. A first length is established by measuring along the first trace from a point at which the first trace is closer to the second electrical pad than the second length to a point at which the first trace is further from the second electrical pad than the second length. The first length is greater than the second length. A mesh is coupled to the base and directly between the plurality of landing areas. The mesh includes a third trace and a fourth trace.

A third length is established by measuring from the first connection point along the first trace to a point at which the first trace is further from the first electrical pad than the second trace. A fourth length is established by measuring along the second trace from a point at which the second trace is closer to the first electrical pad than the first length to a point at which the second trace is further from the first electrical pad than the first length. The fourth length is greater than the third length.

The first and second connection points are between the first and second electrical pads.

A cover includes a non-conducting planar base. A plurality of landing areas are coupled to the base, each landing area including a first and a second electrical pad spaced apart from each other no more than 150 micrometers, each electrical pad having four sides and elevated from the base, the first and second electrical pads being electrically isolated from each other and surrounded by a first trace, the first trace being adjacent to and surrounding the first electrical pad on at least two sides, with no intervening conductive material between the first trace and the first electrical pad. The first trace is electrically isolated from the first electrical pad. A mesh is coupled to the base and is directly between the plurality of landing areas. The mesh includes a third trace and a fourth trace.

The cover further includes a second trace surrounding the first and second electrical pads. The second trace is nearest to and surrounding the second electrical pad on at least two sides, with no intervening conductive material between the second trace and the second electrical pad. The second trace is electrically isolated from the second electrical pad.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
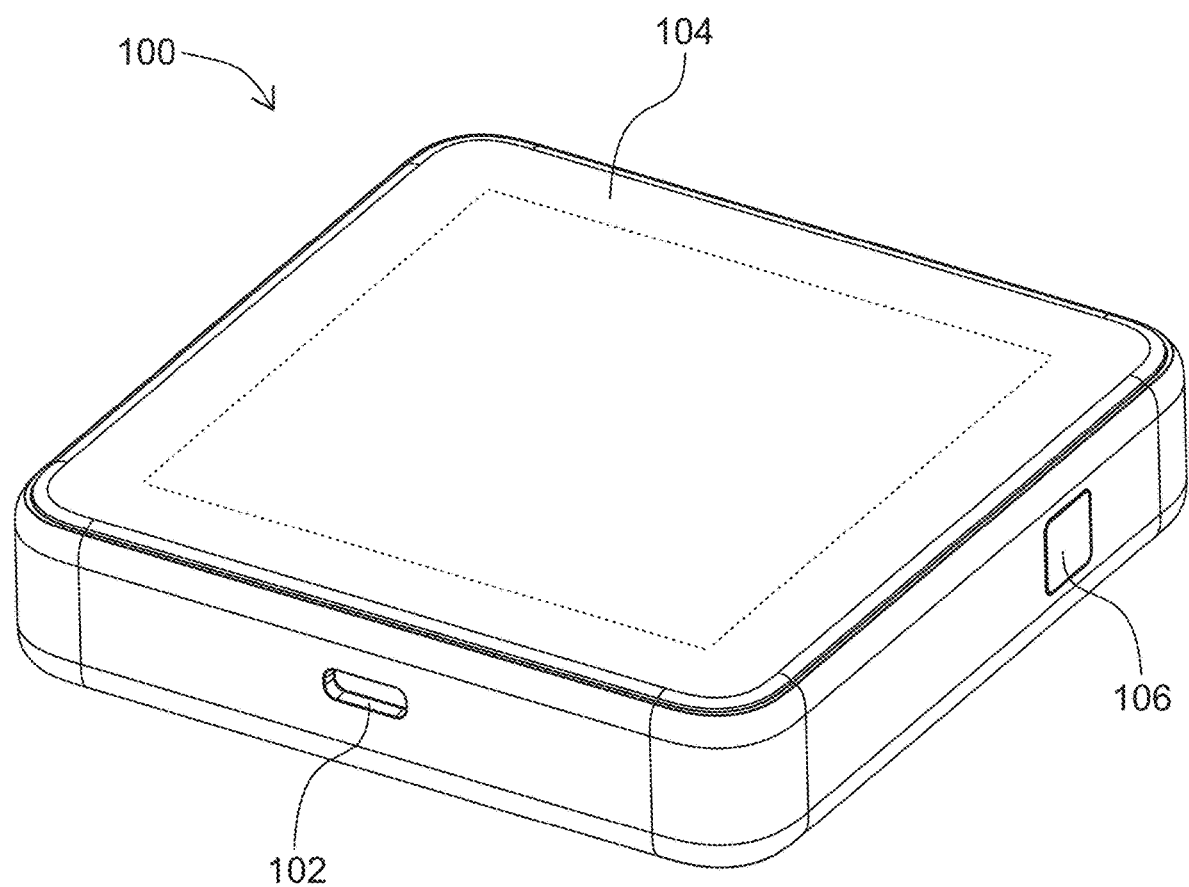
FIG. 1 is a top right perspective view illustrating one example of a credit card reader.

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

A point-of-sale (POS) credit card reader may physically interact with payment instruments such as magnetic stripe payment cards, Europay, MasterCard and Visa (EMV) payment cards, and short-range communication (e.g., near field communication (NFC), radio frequency identification (RFID), Bluetooth, Bluetooth® low energy (BLE), etc.) payment instruments. The reader may provide a rich user interface through the display, communicate with the payment reader, and communicate with a payment processing service server, which may communicate with payment processing service provider server(s). In this manner, the reader may collectively process transaction(s) between a merchant and customer(s).

POS readers may be mobile, such that POS readers may process transactions in disparate locations across the world. For various reasons, a payment processing service provider may contract with a payment processing service regarding where the payment processing service is permitted to collectively process card-present transactions between merchants that utilize POS readers serviced by the payment processing service and customers. As a non-limiting example, a payment processing service provider may contract with a payment processing service such that the payment processing service is permitted to process card-present transactions on behalf of a merchant via a POS reader serviced by the payment processing service in one or more particular regions but is not permitted to process transactions on behalf of the merchant in any region that is not one of the one or more particular regions. For instance, a payment processing service provider may contract with a payment processing service such that the payment processing service is permitted to process card-present transactions on behalf of the merchant in the United States, Canada, and Australia, but is not permitted to process card-present transactions on behalf of the merchant in any other country. That is, if the merchant tries to transact with a customer in China via a card-present transaction using a POS reader serviced by the payment processing service and the payment processing service processes the card-present transaction, the payment processing service may breach its contract with the payment processing service provider. Accordingly, the payment processing service may refrain from processing the card-present transaction (i.e., the payment processing service may not transmit the card-present transaction to the payment processing service provider) to avoid breaking its contract with the payment processing service provider.

For the purpose of this disclosure, a card-present transaction is a transaction where both a customer and their payment instrument are physically present at the time of the transaction. Card-present transactions may be processed by swipes, dips, and/or taps. A swipe is a card-present transaction where a customer slides a card having a magnetic strip through a payment reader that captures payment data contained in the magnetic strip. A dip is a card-present transaction where a customer inserts a card having an embedded microchip (i.e., chip) into a payment reader chip-side first. The card remains in the payment reader until the payment reader prompts the customer to remove the card. While the card is in the payment reader, the microchip creates a one-time code which is sent from the POS reader to a server associated with a payment processing service, a bank, and/or a card payment network (e.g., Mastercard, VISA, etc.) to be matched with an identical one-time code. A tap is a card-present transaction where a customer may tap or hover his or her electronic device such as a smart phone running a payment application over a payment reader to complete a transaction via short-range communication (e.g., NFC, RFID, Bluetooth®, BLE, etc.). Short-range communication enables the electronic device to exchange information with the payment reader. A tap may also be called a contactless payment. In some countries, a customer may engage in a tap using a TAP card instead of an electronic device.

The phrases "in some examples," "according to various examples," "in the examples shown," "in one example," "in other examples," "various examples," "some examples," and the like generally mean the particular feature, structure, or characteristic following the phrase is included as at least one example, and may be included in more than one example without specifically being referred to as such. In addition, such phrases do not necessarily refer to the same examples or to different examples.

If the specification states a component or feature "may," "can," "could," or "might" be included or have a characteristic, that particular component or feature is not required to be included or have the characteristic.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates one example of credit card processing reader 100 such as a point-of-sale (POS) reader for on-premises credit card payments. Such readers typically meet industry requirements if used for processing Visa, Mastercard, American Express, JCB or Discover payments. The security standards are set by the Payment Card Industry Security Standards Council (PCI SSC), which also sets standards for personal identification number (PIN) transaction security (PTS). One of the security standards set is the Payment Card Industry Data Security Standard (PCI DSS). Other security standards are set by a European subgroup of the Joint Interpretation Library (JIL) working group, called the JIL Terminal Evaluation Methodology Subgroup, or JTEMS. The standards serve to protect against fraud and provide for secure entry and transmission of PIN and account data. POS terminals and readers are used in the retail, restaurant, entertainment, healthcare, and service industries, to name a few.

Reader 100 may be a standalone device, or it may be mounted within or on to a cradle, bracket or other holder (not illustrated) and interface through port 102. Port 102 may be any type of serial or parallel communication port, for example a universal serial bus (USB), or any other type of interface. In one example port 102 may be used to provide power to reader 100. In one example port 102 may be used for communication and power to reader 100. Other communication options for reader 100 are discussed below. On the side of reader 100 that is opposite port 102 is a slot (not visible in FIG. 1) into which a credit card may be inserted and read by a payment reader (not illustrated in FIG. 1). This describes a dip, but it should be understood that both a tap and a swipe are both included as potential transaction methods with an appropriately configured terminal, for example with near field communications (NFC). An NFC antenna (not shown in FIG. 1) may be located behind, for example, a display and enable interaction with other NFC devices. Display 104 may be any type of emissive or reflective display, or a combination thereof, for example LED, LCD, OLED, MEMS, ELD, QLED, etc. Additionally display 104 may be touch sensitive such that a user may interact with images present on display 104. Such interactions include viewing an amount to be charged to a card, transaction description, entry or selection of amounts for gratuity, signature input, transaction approval, and so on. Button 106 activates reader 100 and may be used to power down, power up, place reader 100 into a sleep/standby mode or awaken reader 100 from a sleep/standby mode.

Figure 2:
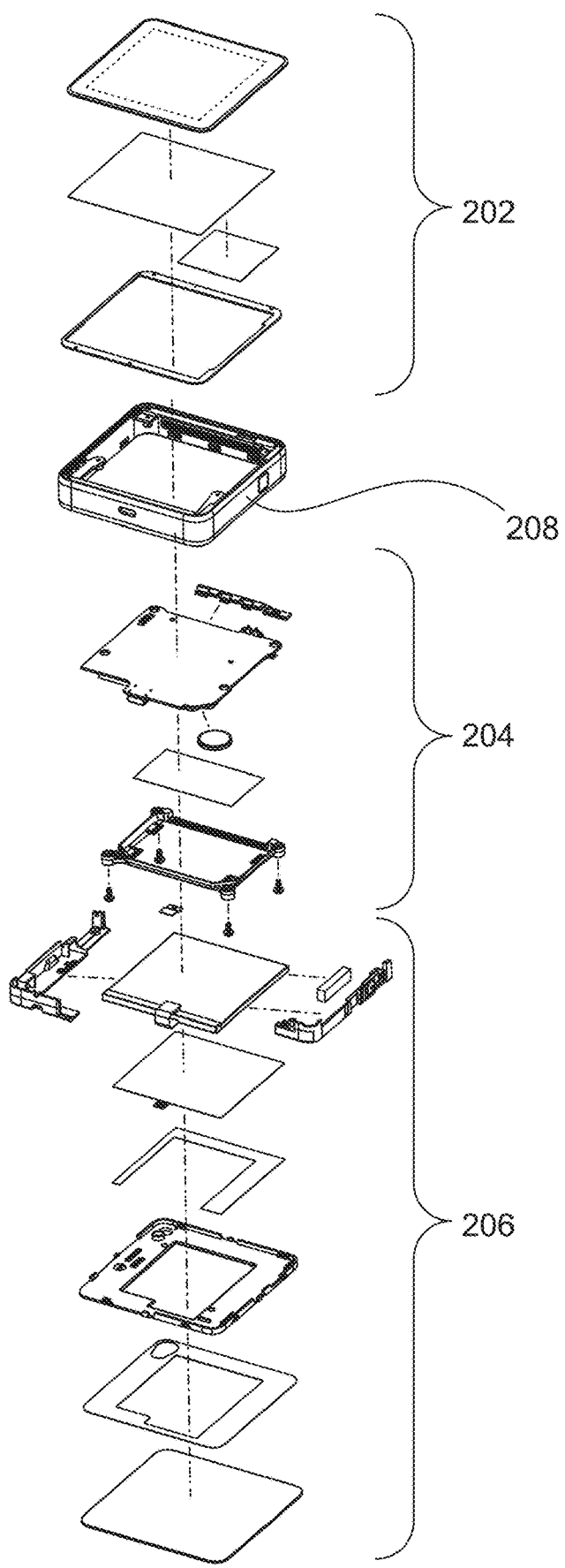
FIG. 2 is an exploded parts diagram illustrating one example of a credit card reader.

FIG. 2 is an exploded parts diagram illustrating one example of credit card processing reader 100. The illustrated parts are broadly grouped into three groups plus a structural component. The groups are communications assembly 202, secure circuit assembly 204 and rear assembly 206. Frame 208 is the structural component. The naming convention with respect to each group is in no way limiting to that group or any other group, for example communications assembly 202 may include more than just communication components, or secure circuit assembly 204 does not mean or imply that other groups are not secure, or that communications may be engaged by rear assembly 206, to name a few examples.

The assembly of reader 100 may be completed by collapsing the parts illustrated in FIG. 2, with communications assembly 202 attaching to the topmost section of frame 208, then secure circuit assembly 204 inserting within frame 208 and underneath communications assembly 202, with rear assembly inserting within frame 208 and under secure circuit assembly 204. This top-down orientation is maintained in FIG. 3, but reversed in FIGS. 4 and 5.

Figure 3:
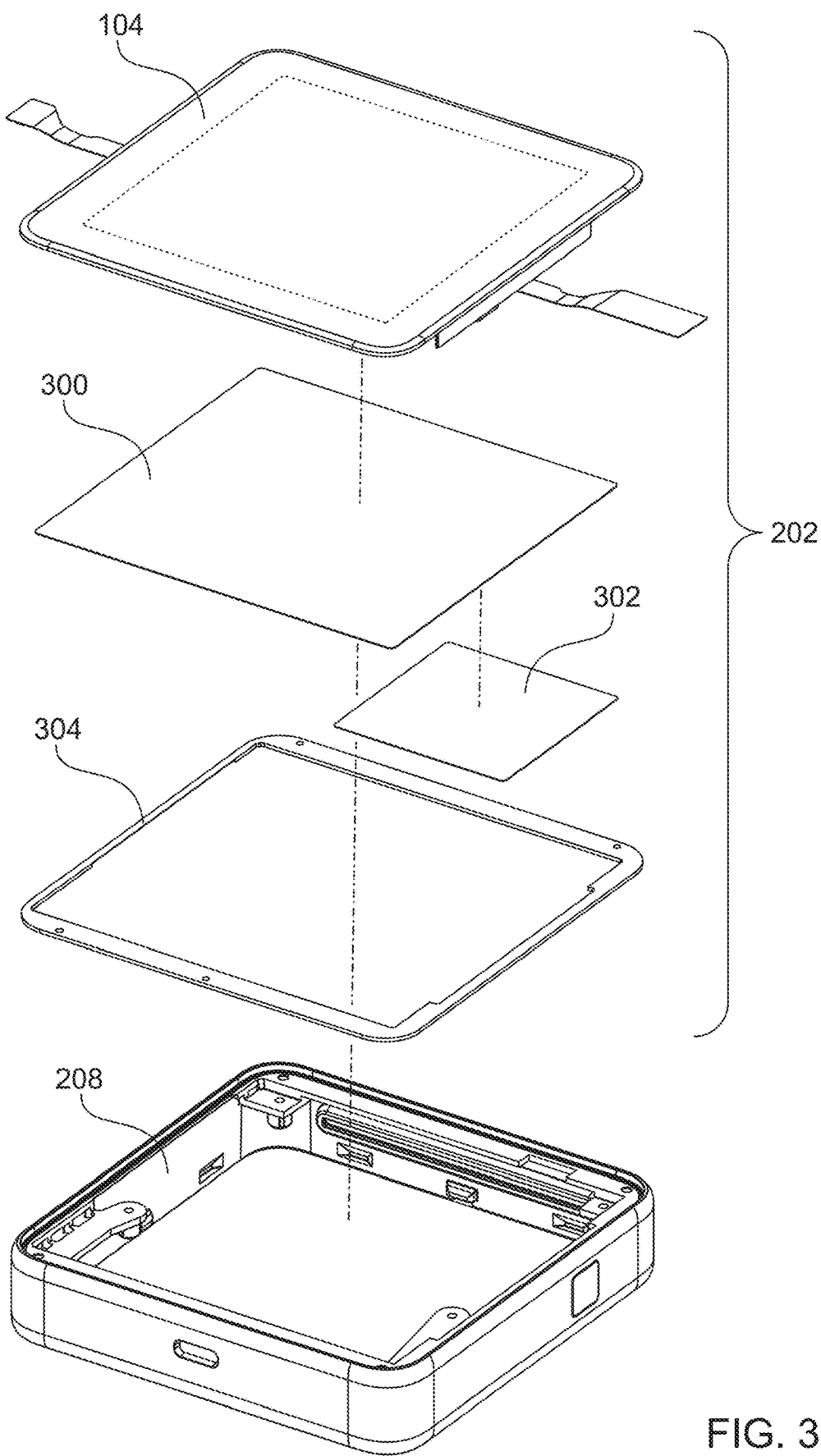
FIG. 3 is a partial exploded parts diagram illustrating one example of a communications assembly from a credit card reader.

FIG. 3 is a partial exploded parts diagram illustrating communications assembly 202 from FIG. 2 in a top-down orientation, as well as frame 208. Communications assembly 202 includes display 104 as previously described with respect to FIG. 1. Also included in communications assembly 202 is shield 300, reflector 302 and antennae 304. Shield 300 attenuates electromagnetic impulses between display 104 and antenna 304, as well as secure circuit assembly 204.

Shield 300 may be useful in reducing losses that occur from metal parts that are on the other side of shield 300 from display 104 (e.g. the PCB, the battery-conductive material that is near shield 300) reducing interference of communications and circuit processing by display 104. Shield 300 may be made from ferrite or other suitable shielding material for short range attenuation, for example NiZn, MnZn, etc.

Figure 5:
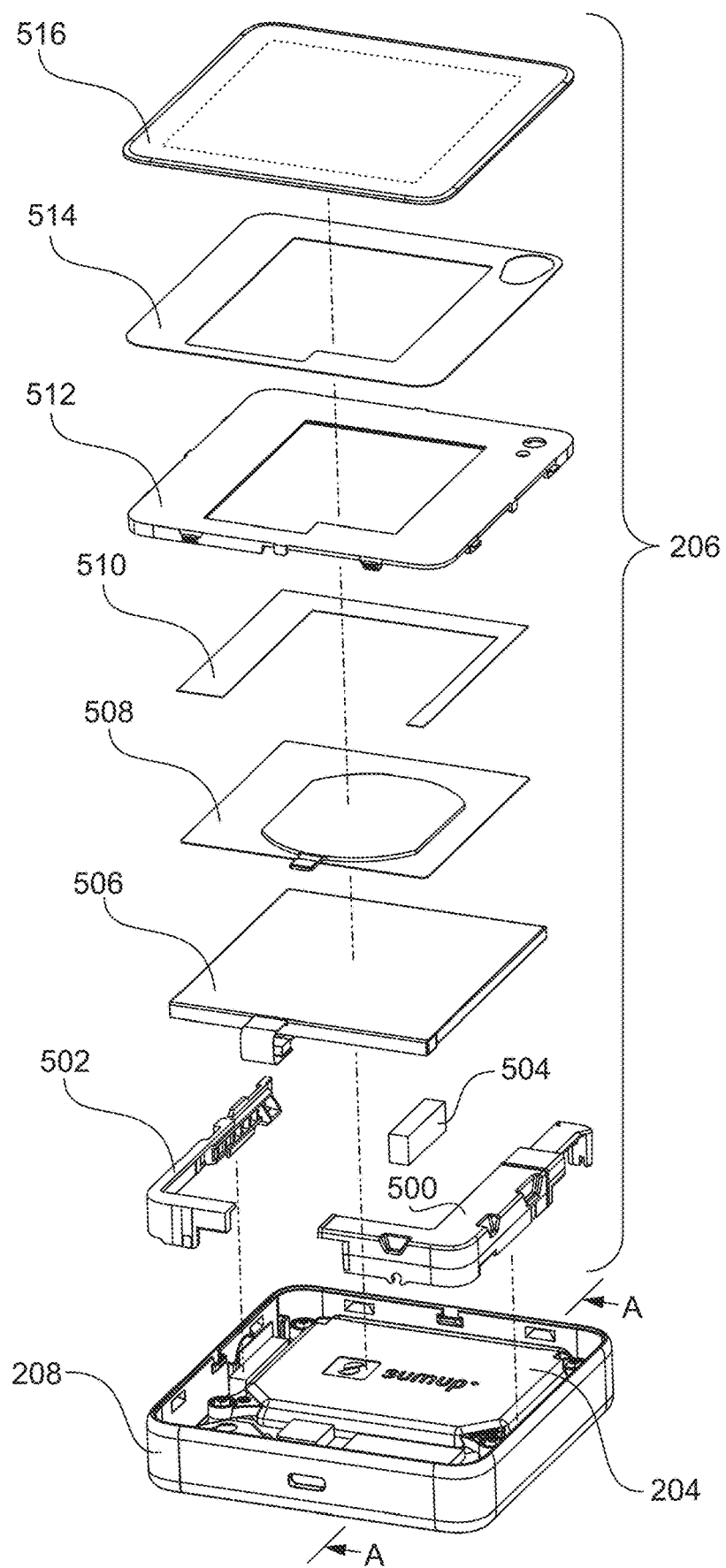
FIG. 5 is a partial exploded parts diagram illustrating one example of a rear assembly from a credit card reader.

Reflector 302 reduces efficiency losses that otherwise would occur for the cellular antenna (see FIG. 5). Reflector 302 may be made of a metal, for example copper, aluminum or steel.

Antennae 304 in this example may be a near field communication (NFC) antenna. NFC is based on inductive coupling between two antennas present on NFC-enabled devices, for example a POS credit card processing reader and a credit card. An NFC system can be used for communicating in one or both directions, using a frequency of 13.56 MHz. One practice of providing a small form factor for a POS reader is by placing a communication coil used by the NFC system in close proximity to the readout display of the processing device. Because of the proximity of the coil and display, operating aspects of the display may cause distortion of the waveforms from the NFC system.

Frame 208 provides structural support and integrity to reader 100 and may be made from injection molded plastic or any other suitable material and manufacturing method. From the perspective shown in FIG. 3, communications assembly 202 stack together near the top of frame 208 once pressed into place.

Figure 4:
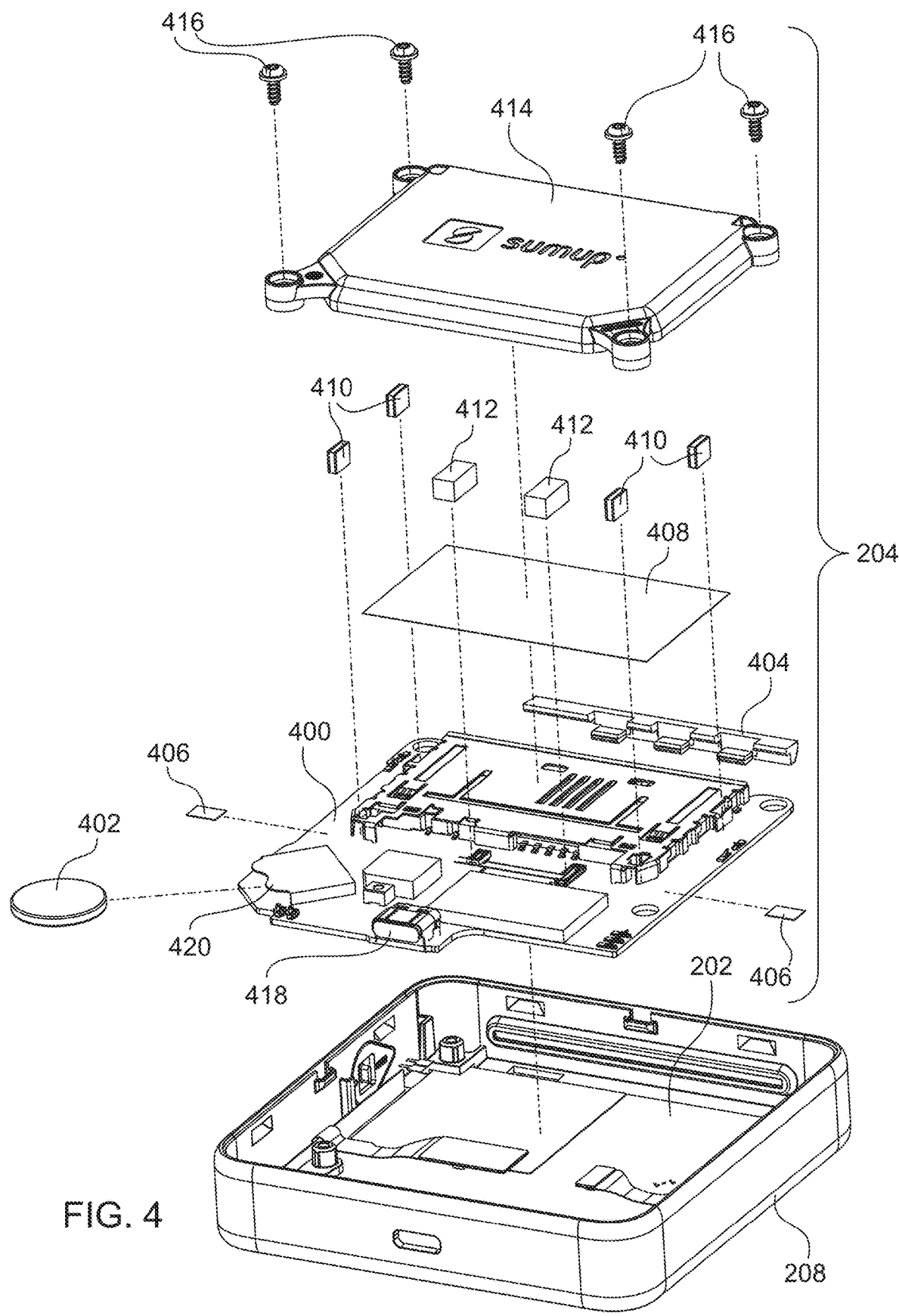
FIG. 4 is a partial exploded parts diagram illustrating one example of a secure circuit assembly from a credit card reader.

FIG. 4 is a partial exploded parts diagram illustrating secure circuit assembly 204 from FIG. 2 in a bottom-down orientation, as well as frame 208 and communications assembly 202. FIG. 4 is in the reverse orientation of FIG. 3, such that communications assembly 202 is pictured at the bottom of frame 208. Secure circuit assembly 204 includes printed circuit board (PCB) 400, battery 402, card guide 404, conductive tape 406, seal tape card connector 408, tamper switches 410, foam display cables 412, cover 414 and screws 416.

PCB 400 includes connector 418 (accessed through port 102), battery bracket 420, conductive LCD tape 406, seal tape card connector 408 to help reduce shorting issues, and foam spacers 412.

In a POS credit-card processing terminal or reader, secure covers and anti-tamper rubber switches are commonly used to pass penetration tests that verify the resistance of the reader against physical attack methods. Secure covers may have grabbers (also referred to as ribs) (not illustrated in FIG. 4) into which conductive rubber blocks are pressed to form a bridge between electrical pads. In one example, the conductive rubber blocks may be zebra connectors, or tamper switches 410. Electrical pads (see FIG. 6) are respectively connected to electrical traces (not illustrated in FIG. 4) and are located on PCB 400. When cover 414 is tightened onto PCB 400 with screws 416, the resistance of tamper switches 410 changes until it is within a determined range. Once reader 100 is in use, if a change in resistance is detected with respect to the circuit connected to tamper switches 410, that is outside the determined range, then reader 100 registers that change as a tamper attempt and reader 100 may be blocked or disabled. Once activated, removing cover 414 dislodges one or more tamper switches 410, causing a change in resistance across the electrical contacts and triggering a tamper attempt. Drilling into cover 414 and connecting a trace from one of the electrical pads, to a trace from another electrical pad (creating a short circuit), also causes a change in resistance and triggers a tamper attempt. This is one example of security for secure circuit assembly 204.

Battery 402 provides backup power for data retention in volatile memory in case of power loss as well as providing continuous power to security sensors. Card guide 404 assists in guiding a credit card at a proper place and angle into reader 100.

FIG. 5 is a partial exploded parts diagram illustrating rear assembly 206 from FIG. 2 in a bottom-down orientation, as well as frame 208 and secure circuit assembly 204. FIG. 5 is in the reverse orientation of FIG. 3, such that communications assembly 202 (not illustrated in FIG. 5) is at the bottom of frame 208, with secure circuit assembly 204 shown on top of communications assembly 202 and inside of frame 208. Rear assembly 206 includes communications assembly 500, button support assembly 502, foam button support 504, battery 506, wireless charging pad 508, adhesive 510, rear support 512, adhesive 514, rear panel 516.

Communications assembly 500 may connect to PCB 400 and provide additional communication capability, for example one or more of the following: cellular, Bluetooth, Bluetooth LE, Wi-Fi, Zigbee, infrared, near field (NFC), etc. Button support assembly 502 and foam button support 504 in conjunction serve as button 106 (see FIG. 1) for power and sleep operations. Button support assembly 502 may connect to PCB 400. Battery 506 provides power to reader 100 and may be rechargeable or non-rechargeable. Examples of rechargeable battery types include lead-acid, nickel-cadmium (NiCd), nickel-metal hydride (NiMH), lithium-ion (Li-ion), lithium-ion polymer (LiPo), and rechargeable alkaline batteries. Wireless charging pad 508 may recharge battery 506 through wireless inductive charging. A magnetic loop antenna (copper coil) is used to create an oscillating magnetic field, which can create a current in one or more receiver antennas in wireless charging pad 508. This current may be used to recharge battery 506. Rear support 512 is bonded to wireless charging pad 508 with adhesive 510. Rear panel 516 is bonded to rear support 512 with adhesive 514. Rear panel 516 may be made from any suitable material, for example metal, glass, plastic, etc.

Figure 6:
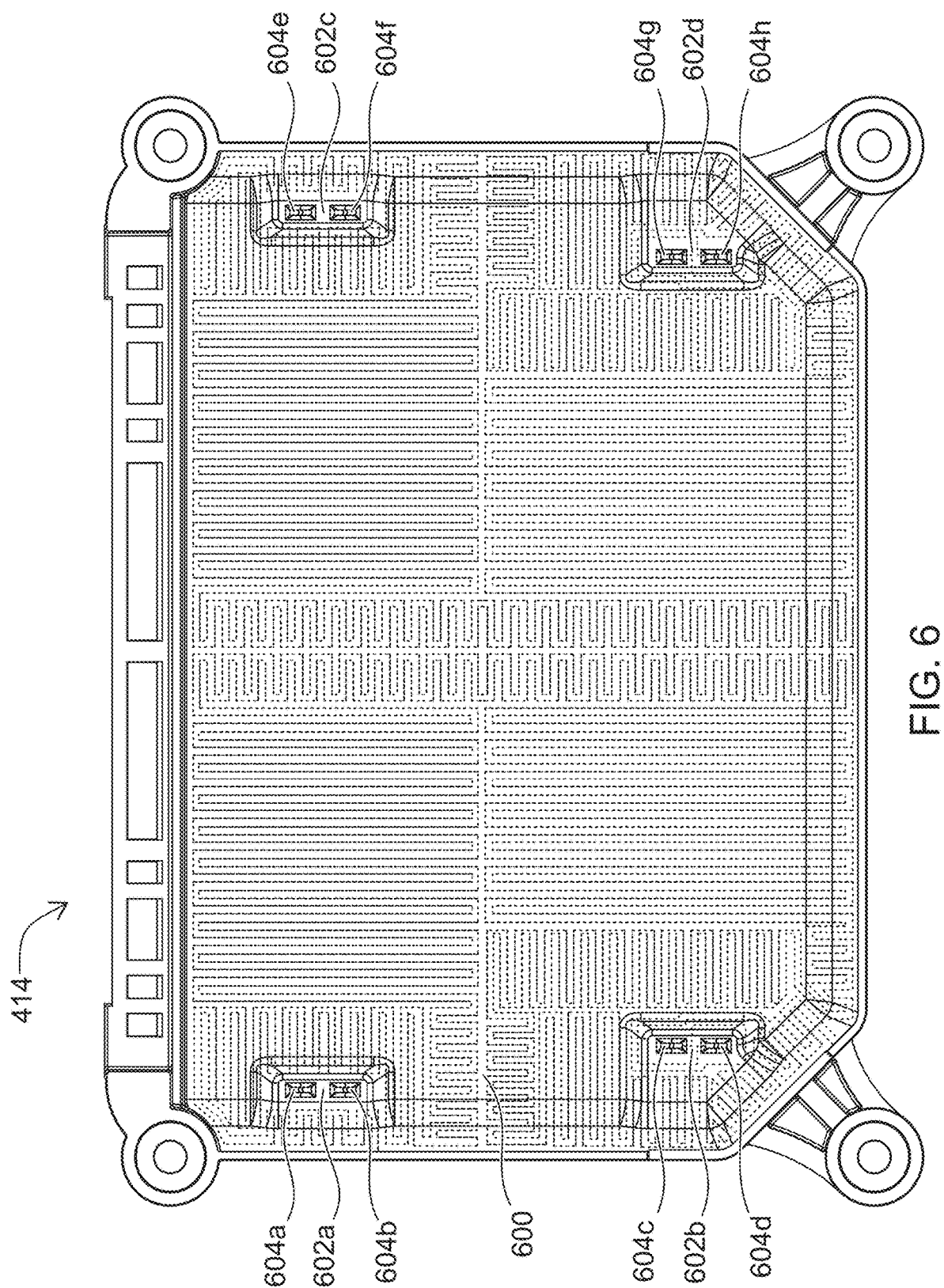
FIG. 6 is a bottom plan view illustrating one example of a secure cover for a credit card reader.

FIG. 6 is a bottom plan view illustrating one example of a secure cover for a credit card reader. A secure cover may be part of the security measures in place for a credit card reader. The secure cover may have a variety of active and/or passive security measures to prevent unauthorized access to the circuitry and electronics over which it sits. These security measures may be prescribed by standard, statute, or they may be optional. One aspect of that security is described below. In one example, the secure cover is cover 414. FIG. 6 illustrates cover 414 from a perspective opposite that illustrated in FIGS. 4 and 5—from the underside of cover 414. Base 600 is a part of cover 414 and may include landing areas 602a, 602b, 602c and 602d (collectively referred to as landing areas 602). Base 600 may be made from a non-conducting (insulating) material and formed by a variety of methods, for example molding (compression, injection, reaction injection, injection blow, extrusion blow, rotational, etc.), vacuum casting, thermoforming, etc. Base 600 may have embedded metal particles that are exposed during manufacturing by a laser. After laser engraving, a chemical bath bonds to the exposed metal in base 600 and forms traces. In one example, base 600 is plastic, though it can be made from other insulating material Although four landing areas 602 are illustrated, one of ordinary skill in the art will recognize that there may be fewer or more landing areas 602. There may be an even number of landing areas 602, for example two, four, six, eight, and so on, as determined by the size of cover 414 and the security needs. There may be an odd number of landing areas 602, for example one, three, five, seven, and so on, as determined by the size of cover 414 and the security needs. A greater number of landing areas 602 may increase the level of security while decreasing reliability in reader 100. Landing areas 602 may include electrical pads 604a, 604b, 604c, 604d, 604e, 604f, 604g and 604h (collectively referred to as electrical pads 604). Although two electrical pads 604 are illustrated with each landing area 602, one of ordinary skill in the art will recognize that there may be more electrical pads 604, depending on landing area 602 configurations. There may be three, four, five, six, seven, etc. electrical pads 604 in a single landing area 602. Electrical pads 604 may be exposed and in one aspect, raised above base 600. During manufacturing, isolating electrical pads 604 and applying a conductive coating or paint may raise them above base 600. Electrical pads 604 that are raised may improve their electrical connectivity with tamper switches 410. In one aspect, electrical pads 604 may be about 2 mm long and about 1.5 mm wide, and separated from one another by about 0.45 mm-2 mm, end-to-end. Specific size and spacing is only exemplary-many size and spacing combinations may be used according to manufacturing tolerances and security requirements. Electrical pads 604 may have a length of less than 2 mm, for example about 1.9 mm, 1.8 mm, 1.7 mm, 1.6 mm, 1.5 mm, 1.4 mm, 1.3 mm, 1.2 mm, 1.1 mm, 1 mm, 0.9 mm, 0.8 mm, 0.7 mm, 0.6 mm, 0.5 mm, etc. and a width less than 1.5 mm, for example about 1.4 mm, 1.3 mm, 1.2 mm, 1.1 mm, 1 mm, 0.9 mm, 0.8 mm, 0.7 mm, 0.6 mm, 0.5 mm, 0.4 mm, 0.3 mm, 0.2 mm, 0.1 mm etc. Electrical pads 604 may be separated from each other (measured edge-to-edge) more than or less than 2 mm, for example about 2.1 mm, 2.2 mm, 2.3 mm, 2.4 mm, 2.5 mm 2.6 mm, 2.7 mm, 2.8 mm, 2.9 mm, 3.0 mm, 3.1 mm, 3.2 mm, 3.3 mm, 3.4 mm, 3.5 mm 3.6 mm, 3.7 mm, 3.8 mm, 3.9 mm, 4.0 mm, 4.1 mm, 4.2 mm, 4.3 mm, 4.4 mm, 4.5 mm 4.6 mm, 4.7 mm, 4.8 mm, 4.9 mm, 5.0 mm (or more), 1.9 mm, 1.8 mm, 1.7 mm, 1.6 mm, 1.5 mm, 1.4 mm, 1.3 mm, 1.2 mm, 1.1 mm, 1 mm, 0.9 mm, 0.8 mm, 0.7 mm, 0.6 mm, 0.5 mm, 0.45 mm (or less), etc. also guided by manufacturing tolerances and security requirements. In one aspect, electrical pads 604 may be separated by 5 mm or less.

In one aspect, landing areas 602 are electrically connected to each other. For example, landing area 602a may be electrically connected to landing area 602b, or 602c, or 602d. Landing area 602b may be electrically connected to landing area 602c, or 602d. Landing area 602c may be electrically connected to landing area 602d. In one aspect, more than two landing areas may be electrically connected together, for example landing area 602a may be connected to landing areas 602b and 602c, or 602c and 602d. In one aspect, landing area 602a is electrically connected to landing area 602c while landing area 602b is electrically connected to landing area 602d. In one aspect, landing area 602a is electrically connected to landing area 602b while landing area 602c is electrically connected to landing area 602d. Among any of the two-landing area connection configurations, with two electrical pads there may be two possible connection configurations. In one aspect of landing areas 602a and 602b being connected, electrical pad 604a may be electrically connected to 604c, while electrical pad 604b may be electrically connected to 604d. In one aspect of the same landing area connection configuration, electrical pad 604a may be electrically connected to 604d, while electrical pad 604b may be electrically connected to 604c. The same type of configuration may be applied to any combination of landing areas 602. Electrical pads 604 may electrically connect through traces that make up a mesh (see FIG. 7) on base 600.

Figure 7:
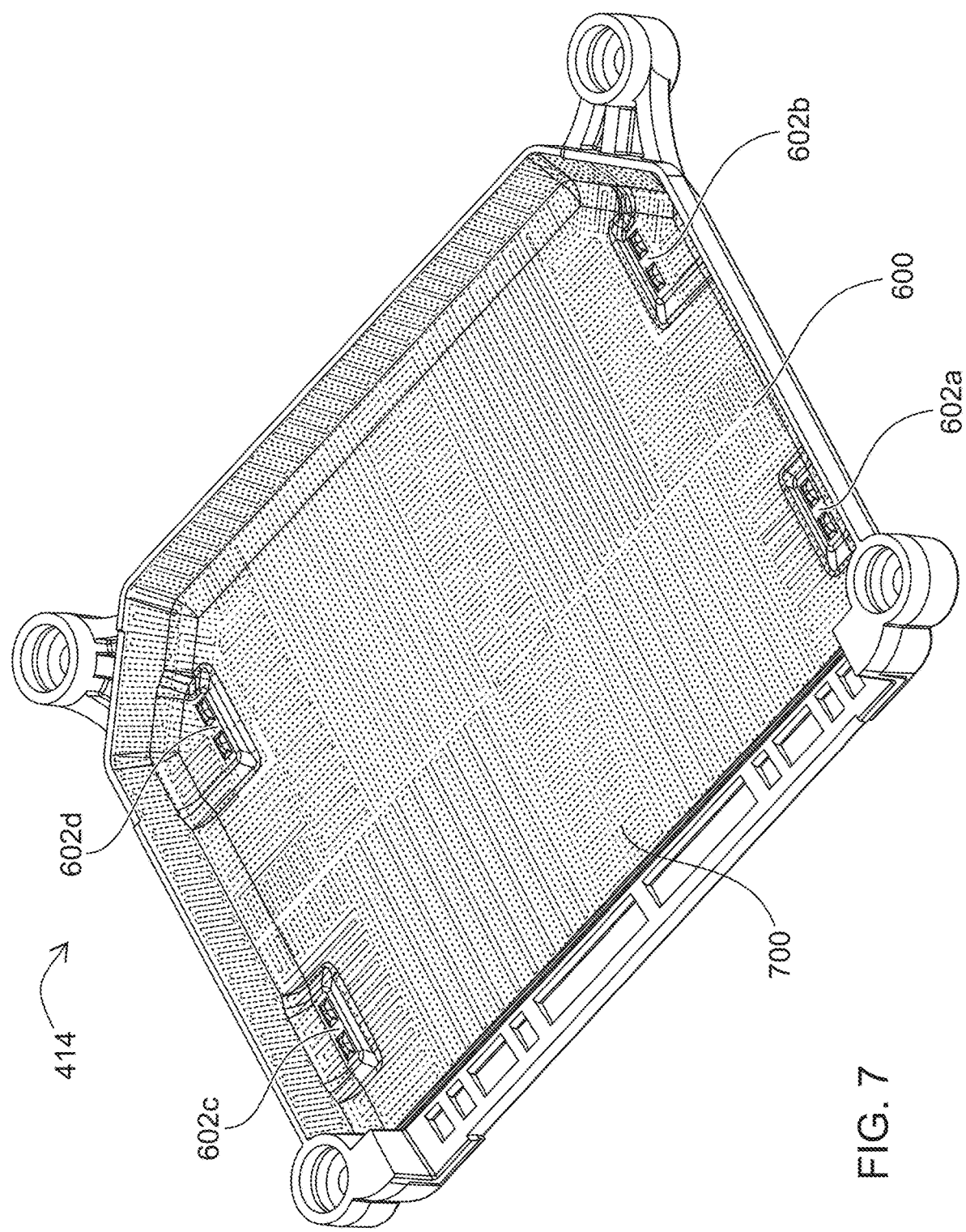
FIG. 7 is a bottom perspective view illustrating one example of a security mesh on a secure cover for a credit card reader.

FIG. 7 is a bottom perspective view illustrating one example of a security mesh on a secure cover for a credit card reader. Cover 414 has depth in order to accommodate elements between base 600 and PCB 400. Connecting landing areas 602 with one another, as described above, is mesh 700. Mesh 700 may extend along the entirety of base 600, including the sides. In one aspect, cover 414 is open on one side where a credit card, for example, may be inserted into reader 100. Mesh 700 includes multiple traces that provide electrical connection between landing areas 602. Mesh 700 is an electrical security screen, part of the security measures of a secure cover. One technique for hacking into a credit card reader includes drilling into cover 414 and accessing tamper switch 410, circuitry from PCB 400, or other components. Mesh 700 includes traces that are near one another and extend along the entire inside of cover 414, such that in credit card processing reader 100, a drill bit passing through base 600 and coming into contact with two adjacent traces creates a short circuit and therefore a change in resistance which is detected and processed as a tamper attempt. This may trigger security protocols for reader 100. In one aspect, mesh 700 includes traces that have a width of 150 μm and are spaced apart from each other by 250 μm. The trace width and spacing may be as small as enabled by manufacturing tolerances, including narrower traces that are closer together.

The trace connecting one landing area 602 with another, for example connecting landing area 602a with 602b, or connecting landing area 602a with 602d, is necessarily greater than the distance between those landing areas because of mesh 700. The length of the trace may be a multiple of the distance between landing areas, for example two times the distance, or three, four, five, six, seven, eight, nine, ten, and so on. The multiple may be fractional, for example 2.83, 5.12, 3.74, etc.

Figure 8:
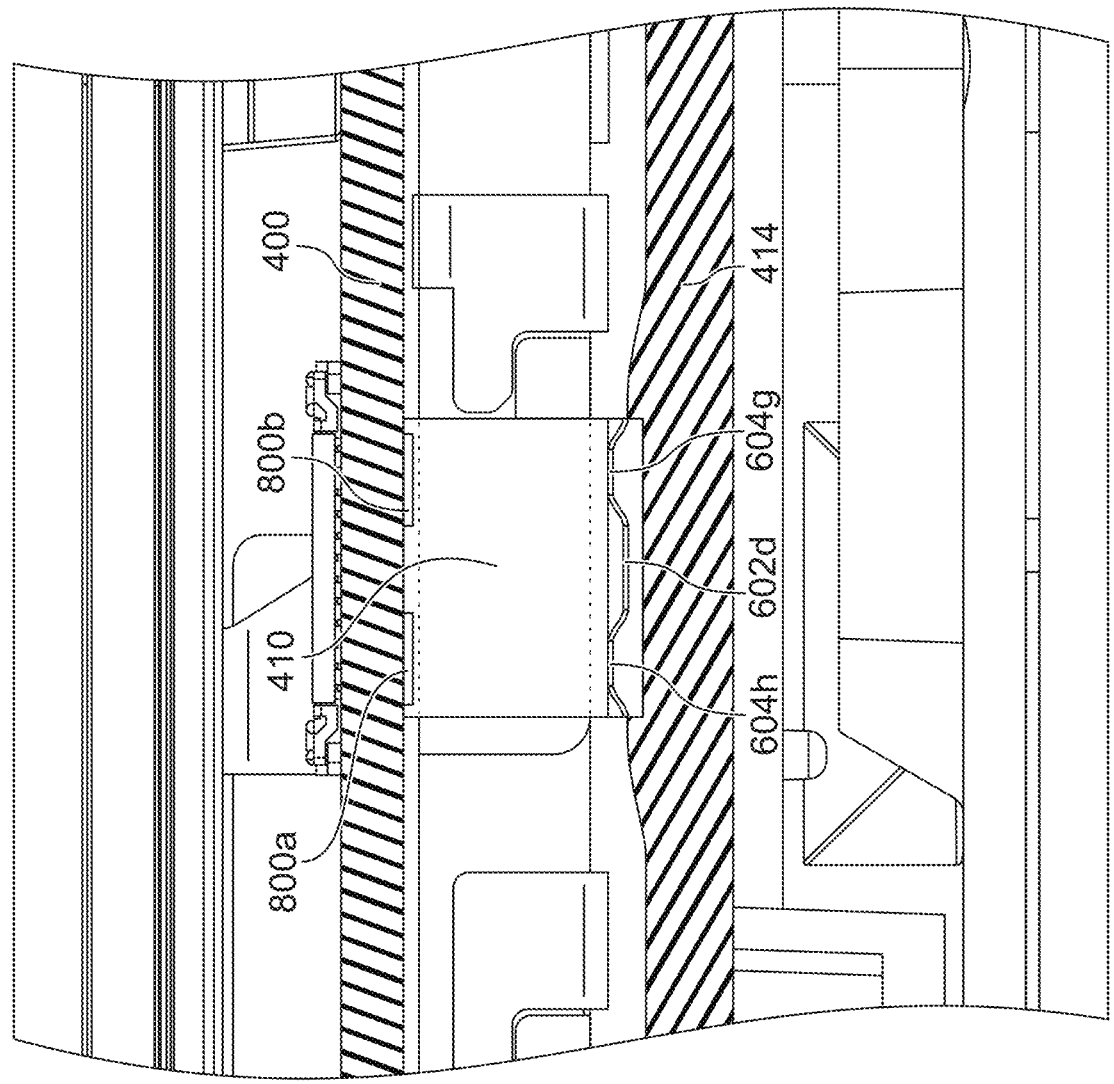
FIG. 8 is a partial cross-sectional view taken across line A-A of FIG. 5 of a landing area connected to a printed circuit board with a tamper switch.

FIG. 8 is a partial cross-sectional view taken across line A-A of FIG. 5 of a landing area connected to a printed circuit board with a tamper switch, for example, a zebra connector. In one aspect, cover 414 includes landing area 602d, with electrical pads 604g and 604h. PCB 400 has electrical contact 800a and 800b (collectively referred to as electrical contacts 800). Electrical pad 604h may be in electrical communication with electrical contact 800a through tamper switch 410. Electrical pad 604g may be in electrical communication with electrical contact 800b through tamper switch 410. Tamper switch 410 may be a conductive block made from rubber, for example, that provides electrical resistance depending on an amount of compressive force exerted on tamper switch 410 between cover 414 and PCB 400. In one aspect, tamper switch 410 may isolate electrical pad 604h from electrical contact 800b. In one aspect, tamper switch 410 may isolate electrical pad 604h from electrical contact 800b.

Figure 9:
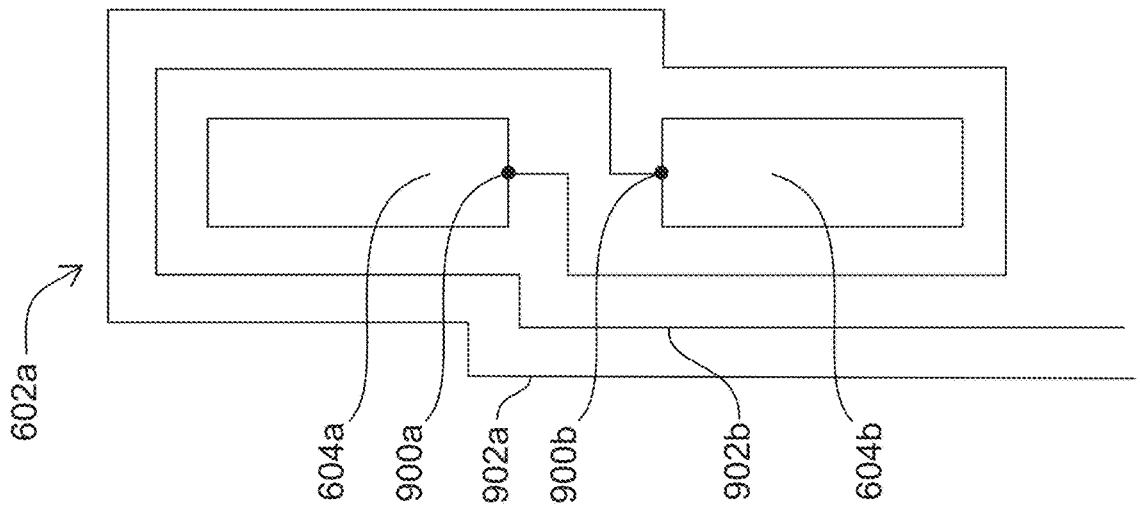
FIG. 9 is a top plan view illustrating one example of trace routing around a landing area.

FIG. 9 is a top plan view illustrating one example of trace routing around a landing area. Trace routing illustrated in FIG. 9 may apply to none, any one, more than one, or all of landing areas 602 on cover 414. In one aspect, landing area 602a includes electrical pads 604a and 604b. Electrical pad 604a is electrically connected to trace 902a at connection point 900a, which is positioned between electrical pads 604a and 604b. Electrical pad 604b is electrically connected to trace 902b (trace 902a and 902b collectively referred to as traces 902) at connection point 900b, which is positioned between electrical pads 604a and 604b. Traces 902 follow a path away from their respective electrical pads. As illustrated in FIG. 9, each trace extends along the opposite electrical pad such that each trace turns back in the direction of their respective pad after a distance greater than the opposite electrical pad. Trace 902a wraps back towards electrical pad 604a after crossing the length of electrical pad 604b and then crossing the width of electrical pad 604b. Electrical pad 604b is surrounded on three sides by trace 902a, which is closer to electrical pad 604b than trace 902b, on those three sides. Trace 902b wraps back towards electrical pad 604b after crossing the length of electrical pad 604a and then crossing the width of electrical pad 604a. Electrical pad 604a is surrounded on three sides by trace 902b, which is closer to electrical pad 604a than trace 902a, on those three sides. Each of traces 902 connects to a trace (not illustrated in FIG. 9) in mesh 700. The proximity of each trace 902 to an electrical pad to which the trace is not connected increases security at landing pad 602a. In an attempted hack of reader 100, a drill attempt near one of the electrical pads has a greater likelihood of triggering a tamper event because the surrounding trace originates from the opposite electrical pad. If the drill bit contacts the electrical pad and surrounding trace then the tamper event is triggered and security measures may be enacted.

Figure 10:
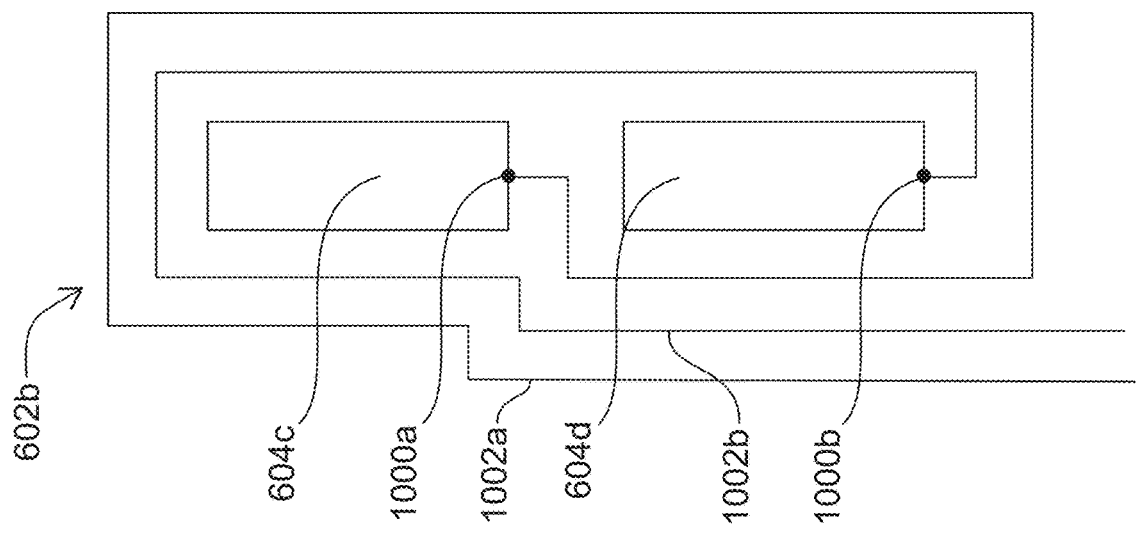
FIG. 10 is a top plan view illustrating one example of trace routing around a landing area.

FIG. 10 is a top plan view illustrating one example of trace routing around a landing area. Trace routing illustrated in FIG. 10 may apply to none, any one, more than one, or all of landing areas 602 on cover 414. In one aspect, landing area 602b includes electrical pads 604c and 604d. Electrical pad 604c is electrically connected to trace 1002a at connection point 1000a, which is positioned between electrical pads 604c and 604d. Electrical pad 604d is electrically connected to trace 1002b (trace 1002a and 1002b collectively referred to as traces 1002) at connection point 1000b, which is not positioned between electrical pads 604c and 604d. Traces 1002 follow a path away from their respective electrical pads. As illustrated in FIG. 10, trace 1002a wraps back towards electrical pad 604c after crossing the length of electrical pad 604c and then crossing the width of electrical pad 604c. Electrical pad 604d is surrounded on two sides by trace 1002a, which is closer to electrical pad 604d than trace 1002b, on those two sides. Trace 1002b wraps back towards electrical pad 604d after extending away from electrical pad 604d, and is parallel to parts of trace 1002a. Electrical pad 604c is surrounded on three sides by trace 1002b, which is closer to electrical pad 604c than trace 1002a, on those three sides. Each of traces 1002 connects to a trace (not illustrated in FIG. 10) in mesh 700. The proximity of each trace 1002 to an electrical pad to which the trace is not connected increases security at landing pad 602b.

Figure 11:
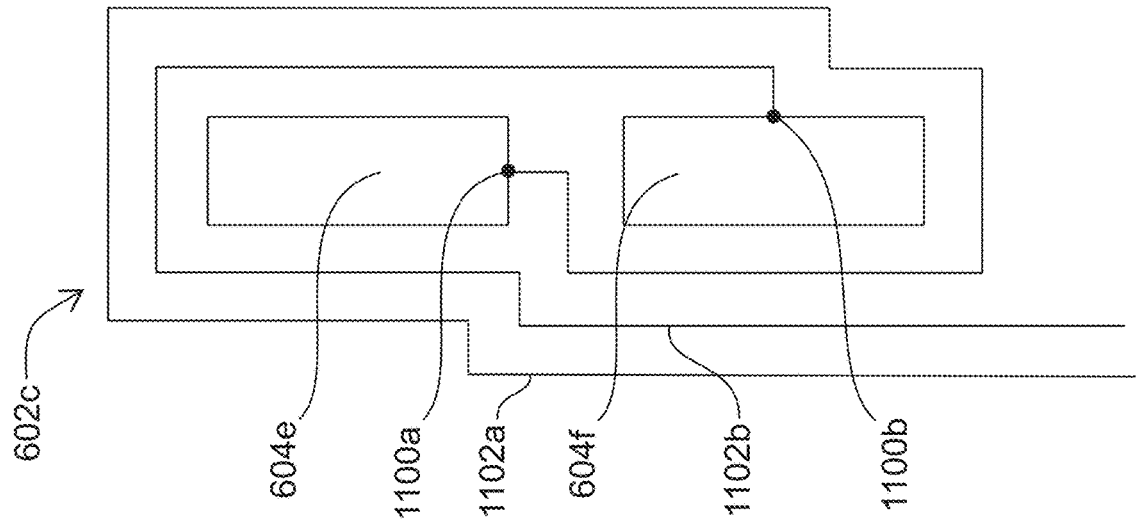
FIG. 11 is a top plan view illustrating one example of trace routing around a landing area.

FIG. 11 is a top plan view illustrating one example of trace routing around a landing area. Trace routing illustrated in FIG. 11 may apply to none, any one, more than one, or all of landing areas 602 on cover 414. In one aspect, landing area 602c includes electrical pads 604e and 604f. Electrical pad 604e is electrically connected to trace 1102a at connection point 1100a, which is positioned between electrical pads 604e and 604f. Electrical pad 604f is electrically connected to trace 1102b (trace 1102a and 1102b collectively referred to as traces 1102) at connection point 1100b, which is not positioned between electrical pads 604e and 604f. Traces 1102 follow a path away from their respective electrical pads. As illustrated in FIG. 11, trace 1102a wraps back towards electrical pad 604e after crossing the length of electrical pad 604e and then crossing the width of electrical pad 604e. Electrical pad 604f is surrounded on three sides by trace 1102a, which is closer to electrical pad 604f than trace 1102b, on those three sides. Trace 1102b wraps back towards electrical pad 604f after traversing along and then extending away from electrical pad 604f, and is parallel to parts of trace 1102a. Electrical pad 604e is surrounded on three sides by trace 1102b, which is closer to electrical pad 604e than trace 1102a, on those three sides. Each of traces 1102 connects to a trace (not illustrated in FIG. 11) in mesh 700. The proximity of each trace 1102 to an electrical pad to which the trace is not connected increases security at landing pad 602c.

Figure 12:
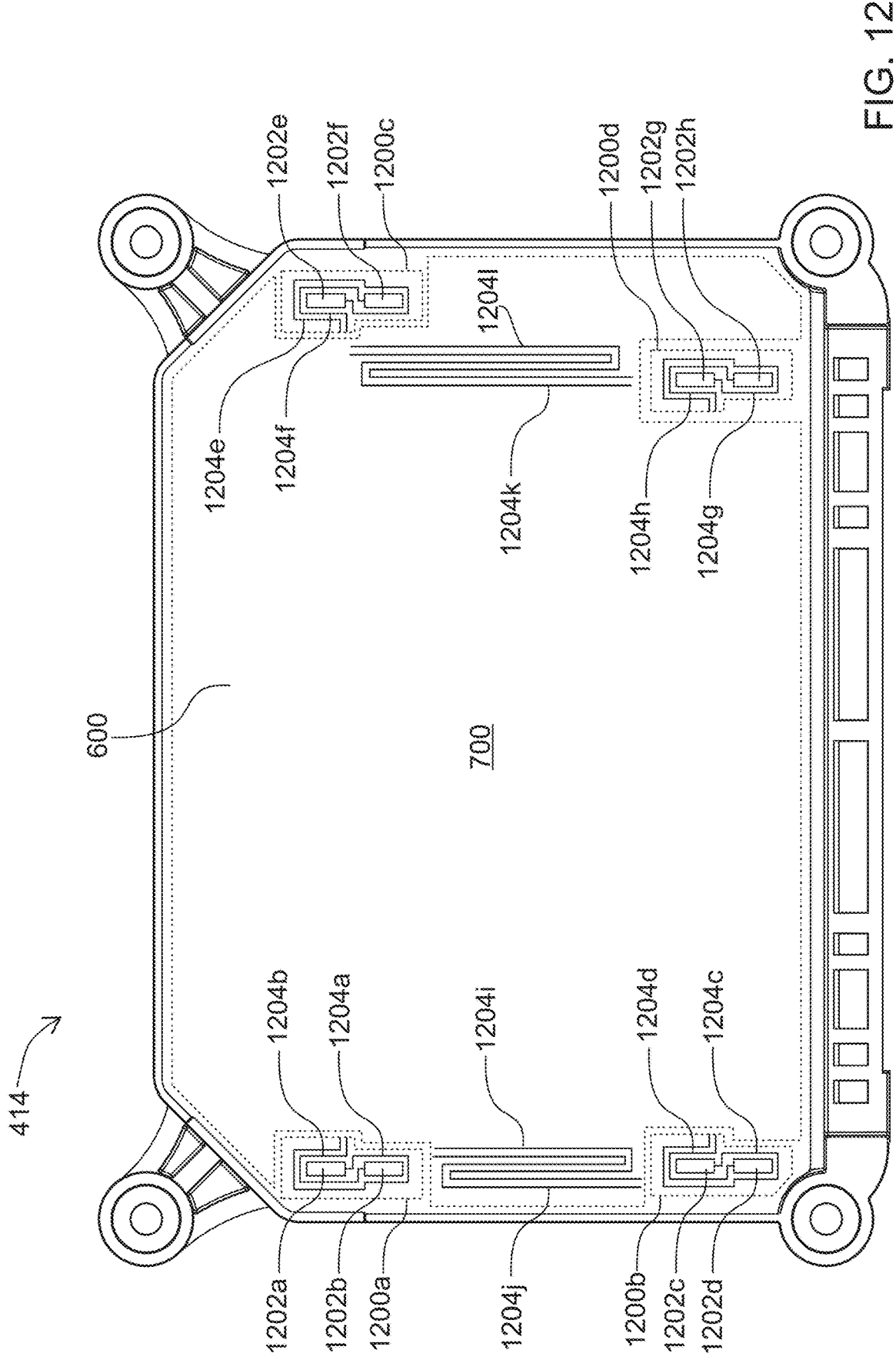
FIG. 12 is a schematic representation illustrating one example of a secure cover with landing areas.

FIG. 12 is a schematic representation illustrating one example of a secure cover with a plurality of landing areas. The example illustrated by FIG. 12 includes reference numbers different from those previously applied to similar components because the example is one particular configuration. Many configurations are possible, that in order to illustrate would require additional and different reference numbers. The use of different reference numbers is for clarity and only as an example, not necessarily to distinguish or separate from that which was previously described.

Cover 414 includes non-conducting base 600 with landing areas 1200a, 1200b, 1200c and 1200d (collectively referred to as landing areas 1200). Landing areas 1200 may be raised from base 600 by the manufacturing process. Landing areas 1200 have a similar configuration to landing area 602a illustrated in FIG. 9. Landing area 1200a may include electrical pads 1202a and 1202b, along with trace 1204a electrically connected to electrical pad 1202a, and trace 1204b electrically connected to electrical pad 1202b. Landing area 1200b may include electrical pads 1202c and 1202d, along with trace 1204c electrically connected to electrical pad 1202c, and trace 1204d electrically connected to electrical pad 1202d. Landing area 1200c may include electrical pads 1202e and 1202f, along with trace 1204e electrically connected to electrical pad 1202e, and trace 1204f electrically connected to electrical pad 1202f. Landing area 1200d may include electrical pads 1202g and 1202h, along with trace 1204g electrically connected to electrical pad 1202g, and trace 1204h electrically connected to electrical pad 1202h.

Landing area 1200a connects to landing area 1200b through mesh 700. Landing area 1200c connects to landing area 1200d through mesh 700. Mesh 700 is represented without illustrating the totality of trace connections, for clarity. Traces 1204i, 1204j, 1204k and 1204l are exemplary and illustrate one partial path that may be taken. Each of traces 1204i-l may occupy some of the space covered by mesh 700, most of the space covered by mesh 700, or the entire space covered by mesh 700, covering all of base 600 including the sides, and each having a total length greater than double (or more than 5×, or more than 6×, or more than 7×, or more than 8×, or more than 9×, or more than 10×, depending on the security needs, configuration size, dimensions of both cover and tolerances for making the mesh, and other factors) the distance between any of landing areas 1200. Other trace lines not illustrated in FIG. 12 may be present. Trace 1204a may connect to trace 1204i, which may connect to trace 1204c. This results in an electrical connection between electrical pads 1202a and 1202c. Trace 1204b may connect to trace 1204j, which may connect to trace 1204d. This results in an electrical connection between electrical pads 1202b and 1202d. Trace 1204e may connect to trace 1204k, which may connect to trace 1204g. This results in an electrical connection between electrical pads 1202e and 1202g. Trace 1204f may connect to trace 1204l, which may connect to trace 1204h. This results in an electrical connection between electrical pads 1202f and 1202h.

Figure 13:
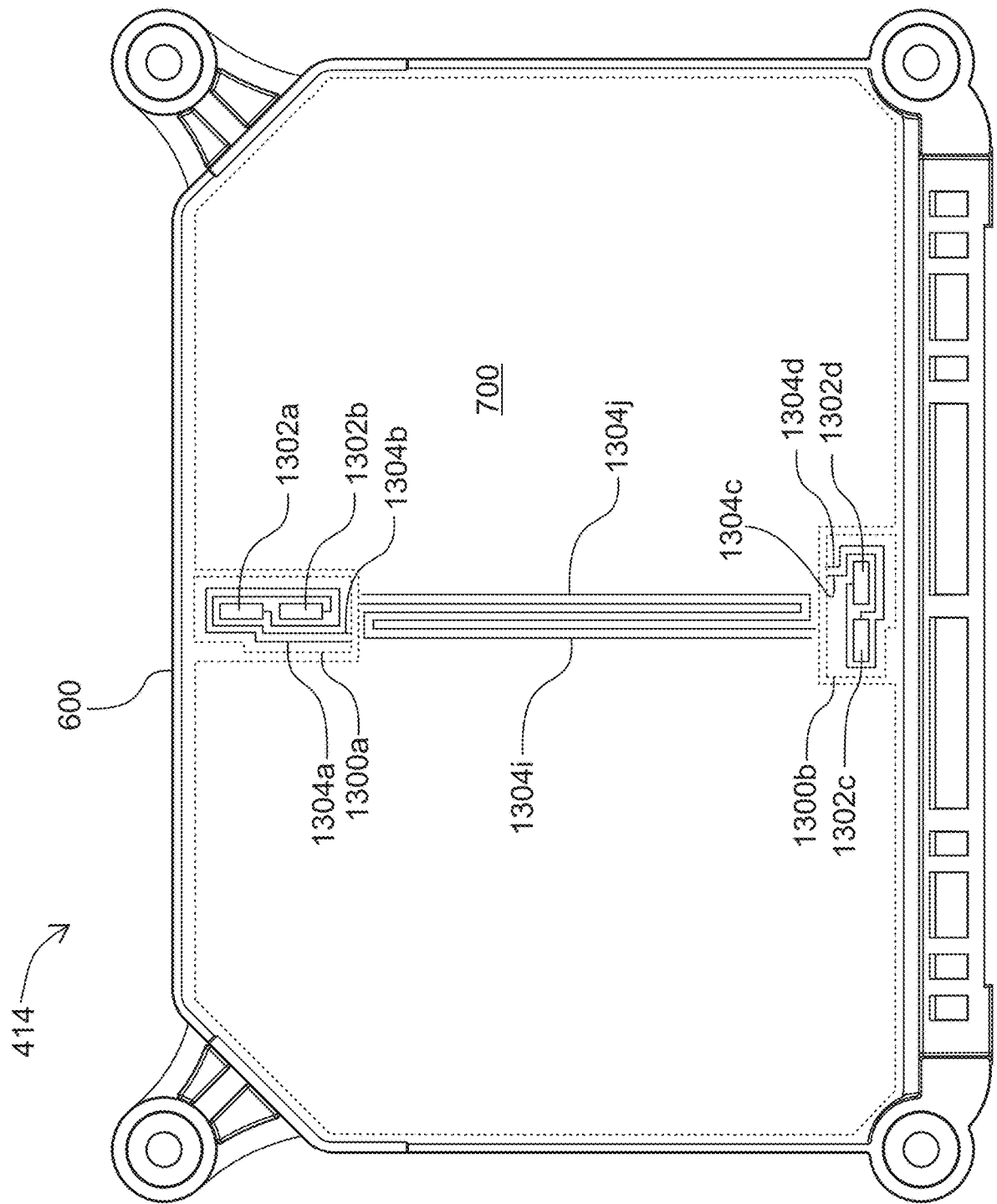
FIG. 13 is a schematic representation illustrating one example of a secure cover with landing areas.

FIG. 13 is a schematic representation illustrating one example of a secure cover with landing areas. The example illustrated by FIG. 13 includes reference numbers different from those previously applied to similar components because the example is one particular configuration. Many configurations are possible, that in order to illustrate would require additional and different reference numbers. The use of different reference numbers is for clarity and only as an example, not necessarily to distinguish or separate from that which was previously described.

Cover 414 includes non-conducting base 600 with landing areas 1300a and 1300b (collectively referred to as landing areas 1300). Landing areas 1300 may be raised from base 600 by the manufacturing process. Landing area 1300a has a similar configuration to landing area 602b illustrated in FIG. 10. Landing area 1300b has a similar configuration to landing area 602c illustrated in FIG. 11. Landing area 1300a may include electrical pads 1302a and 1302b, along with trace 1304a electrically connected to electrical pad 1302a, and trace 1304b electrically connected to electrical pad 1302b. Landing area 1300b may include electrical pads 1302c and 1302d, along with trace 1304c electrically connected to electrical pad 1302c, and trace 1304d electrically connected to electrical pad 1302d.

Landing area 1300a connects to landing area 1300b through mesh 700. Mesh 700 is represented without illustrating the totality of trace connections, for clarity. Traces 1304i and 1304j are exemplary and illustrate one partial path that may be taken. Each of traces 1304i and 1304j may occupy some of the space covered by mesh 700, most of the space covered by mesh 700, or the entire space covered by mesh 700, covering all of base 600 including the sides, and each having a total length greater than double (or more than 3×, or more than 4×, or more than 5×, or more than 6×, or more than 7×, or more than 8×, or more than 9×, or more than 10×, depending on the security needs, configuration size, dimensions of both cover and tolerances for making the mesh, and other factors) the distance between any of landing areas 1300. Other trace lines not illustrated in FIG. 13 may be present. Trace 1304a may connect to trace 1304i, which may connect to trace 1304c. This results in an electrical connection between electrical pads 1302a and 1302c. Trace 1304b may connect to trace 1304j, which may connect to trace 1304d. This results in an electrical connection between electrical pads 1302b and 1302d.

Figure 14:
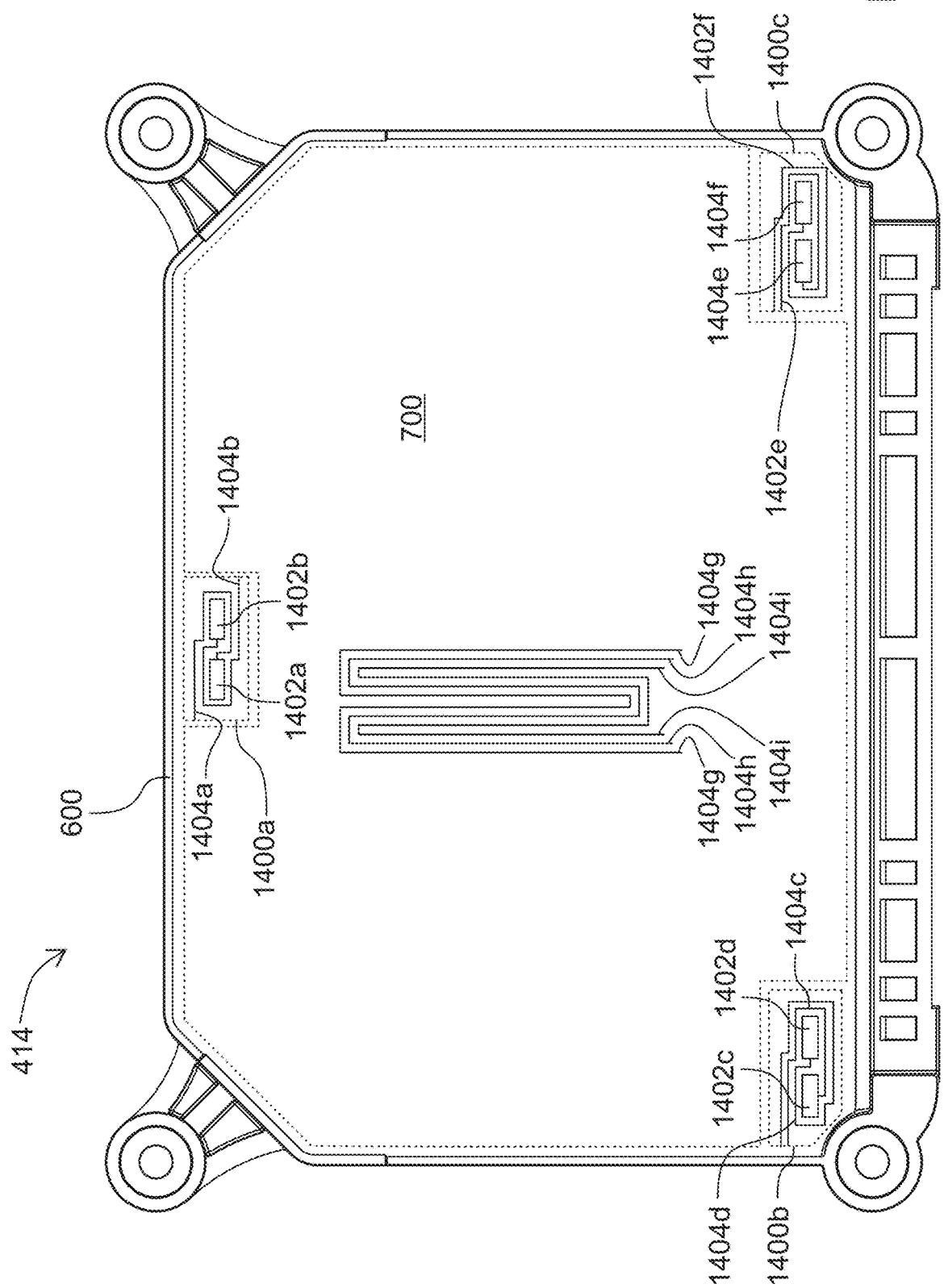
FIG. 14 is a schematic representation illustrating one example of a secure cover with landing areas.

FIG. 14 is a schematic representation illustrating one example of a secure cover with landing areas. The example illustrated by FIG. 14 includes reference numbers different from those previously applied to similar components because the example is one particular configuration. Many configurations are possible, that in order to illustrate would require additional and different reference numbers. The use of different reference numbers is for clarity and only as an example, not necessarily to distinguish or separate from that which was previously described.

Cover 414 includes non-conducting base 600 with landing areas 1400a, 1400b, and 1400c (collectively referred to as landing areas 1400). Landing areas 1400 may be raised from base 600 by the manufacturing process. Landing area 1400a has a similar configuration to landing area 602a illustrated in FIG. 9. Landing area 1400b has a similar configuration to landing area 602b illustrated in FIG. 10. Landing area 1400c has a similar configuration to landing area 602c illustrated in FIG. 11. Landing area 1400a may include electrical pads 1402a and 1402b, along with trace 1404a electrically connected to electrical pad 1402a, and trace 1404b electrically connected to electrical pad 1402b. Landing area 1400b may include electrical pads 1402c and 1402d, along with trace 1404c electrically connected to electrical pad 1402c, and trace 1404d electrically connected to electrical pad 1402d. Landing area 1400c may include electrical pads 1402e and 1402f, along with trace 1404e electrically connected to electrical pad 1402e, and trace 1404f electrically connected to electrical pad 1402f.

Landing area 1400a connects to landing areas 1400b and 1400c through mesh 700. Mesh 700 is represented without illustrating the totality of trace connections, for clarity. Traces 1204g, 1204h, and 1204i are exemplary and illustrate one partial path that may be taken. Each of traces 1204g-i may occupy the entire space covered by mesh 700, covering all of base 600 including the sides, and each having a total length greater than double (or more than 3×, or more than 4×, or more than 5×, or more than 6×, or more than 7×, or more than 8×, or more than 9×, or more than 10×, depending on the security needs, configuration size, dimensions of both cover and tolerances for making the mesh, and other factors) the distance between any of landing areas 1400. Trace 1404a may connect to trace 1204g, which may connect to trace 1404c. This results in an electrical connection between electrical pads 1402a and 1402c. Trace 1404b may connect to trace 1404g, which may connect to trace 1404f. This results in an electrical connection between electrical pads 1402b and 1402f. Trace 1404d may connect to trace 1404h, which may connect to trace 1404e. This results in an electrical connection between electrical pads 1402d and 1402e.

This disclosure refers to the term "reader" throughout, and while specifically directed towards a credit card reader, the disclosure applies equally well to a traditional credit card terminal. Nothing in the disclosure should be taken as limiting to a reader over a terminal. Moreover, many aspects of the disclosure apply equally well to any electronic device with similar physical security needs, as would be recognized by one skilled in the art.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors.

Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps, or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include features of a claim to any other independent claim even if this claim is not directly made dependent to the independent claim.

What is claimed is:

1. A credit card processing reader comprising:
   a printed circuit board (PCB);
   a cover with a non-conducting base, the cover including a plurality of landing areas coupled to the base, each landing area including a first and a second exposed electrical pad, a first trace electrically coupled to the first electrical pad at a first connection point, a second trace electrically coupled to the second electrical pad at a second connection point, the first connection point being directly between the first electrical pad and the second electrical pad, a security mesh coupled to the base; and
   a plurality of tamper switches coupled to and between the PCB and the cover, each of the plurality of tamper switches connected to one of the plurality of landing areas.

2. The credit card processing reader of claim 1, wherein following a first path along the first trace starting at the first connection point and moving away from the first connection point, the first trace turning in the direction of the first electrical pad only after a distance along the first path at least greater than a length of the second electrical pad.

3. The credit card processing reader of claim 2, wherein the second connection point being directly between the first electrical pad and the second electrical pad.

4. The credit card processing reader of claim 3, wherein following a second path along the second trace starting at the second connection point and moving away from the second connection point, the second trace turning in the direction of the second electrical pad only after a distance along the second path at least greater than a length of the first electrical pad.

5. The credit card processing reader of claim 3, wherein the security mesh entirely covering one side of the base not covered by the plurality of landing areas.

6. The credit card processing reader of claim 3, wherein a distance between the first and second trace being between 100 and 200 micrometers.

7. The credit card processing reader of claim 3, wherein the plurality of landing areas being on and defined by a raised surface such that they form a plane separate from a plane formed by the base.

8. The credit card processing reader of claim 2, wherein the second electrical pad further comprising:
   a side adjacent to the first electrical pad; and
   a plurality of sides nonadjacent to the first electrical pad, the second connection point at one of the plurality of sides nonadjacent to the first electrical pad.

9. The credit card processing reader of claim 8, wherein following a second path along the second trace starting at the second connection point and moving away from the second connection point, the second trace turning in the direction of the second electrical pad only after a distance along the second path at least greater than a length of the first electrical pad.

10. The credit card processing reader of claim 8, wherein following a second path along the second trace starting at the second connection point and moving away from the second connection point, directly following the second connection point the second trace having a first turn, directly following the first turn the second trace having a second turn, directly following the second turn the second trace having a third turn, the second trace having a length between the second turn and the third turn greater than the sum of the lengths of the first electrical pad and the second electrical pad, the second trace being straight between the second turn and the third turn.

11. A credit card processing reader comprising:
    a printed circuit board;
    a cover with a non-conducting base, the cover including a plurality of landing areas coupled to the base, each landing area including a first and a second exposed electrical pad, a first trace electrically coupled to the first electrical pad, a second trace electrically coupled to the second electrical pad, the first trace having a first length that is immediately adjacent to the second electrical pad and closer to the second electrical pad than the second trace, the second trace having a second length that is immediately adjacent to the second electrical pad and closer to the second electrical pad than the first trace, the first length being greater than the second length;
    a security mesh coupled to the base; and
    a plurality of tamper switches coupled to and between the printed circuit board and the cover, each of the plurality of tamper switches connected to one of the plurality of landing areas.

12. The credit card processing reader of claim 11, wherein the security mesh entirely covering one side of the base not covered by the plurality of landing areas.

13. The credit card processing reader of claim 11, wherein a distance between the first and second trace being between 100 and 200 micrometers.

14. The credit card processing reader of claim 11, wherein the plurality of landing areas being on and defined by a raised surface such that they form a plane separate from a plane formed by the base.

15. The credit card processing reader of claim 11, wherein the second electrical pad further comprising:
    a side adjacent to the first electrical pad; and
    a plurality of sides nonadjacent to the first electrical pad, the second trace directly connected to the second electrical pad at one of the plurality of sides nonadjacent to the first electrical pad.

16. A credit card processing reader comprising:
    a printed circuit board (PCB);
    a cover with a non-conducting base, the cover including a plurality of landing areas coupled to the base, each landing area including a first and a second exposed electrical pad, the second electrical pad further including a side adjacent to the first electrical pad and a plurality of sides nonadjacent to the first electrical pad, a first trace electrically coupled to the first electrical pad at a first connection point, a second trace electrically coupled to the second electrical pad at a second connection point, the second connection point at one of the plurality of sides nonadjacent to the first electrical pad, the first connection point being directly between the first electrical pad and the second electrical pad, a security mesh coupled to the base; and a plurality of tamper switches coupled to and between the PCB and the cover, each of the plurality of tamper switches connected to one of the plurality of landing areas.

17. The credit card processing reader of claim 16, wherein the plurality of sides nonadjacent to the first electrical pad further include a long side and a short side, the second connection point at the short side.

18. The credit card processing reader of claim 16, wherein the security mesh entirely covering one side of the base not covered by the plurality of landing areas.

19. The credit card processing reader of claim 16, wherein a distance between the first and second trace being between 100 and 200 micrometers.

20. The credit card processing reader of claim 16, wherein the plurality of landing areas being on and defined by a raised surface such that they form a plane separate from a plane formed by the base.

* * * * *